Figure 1:
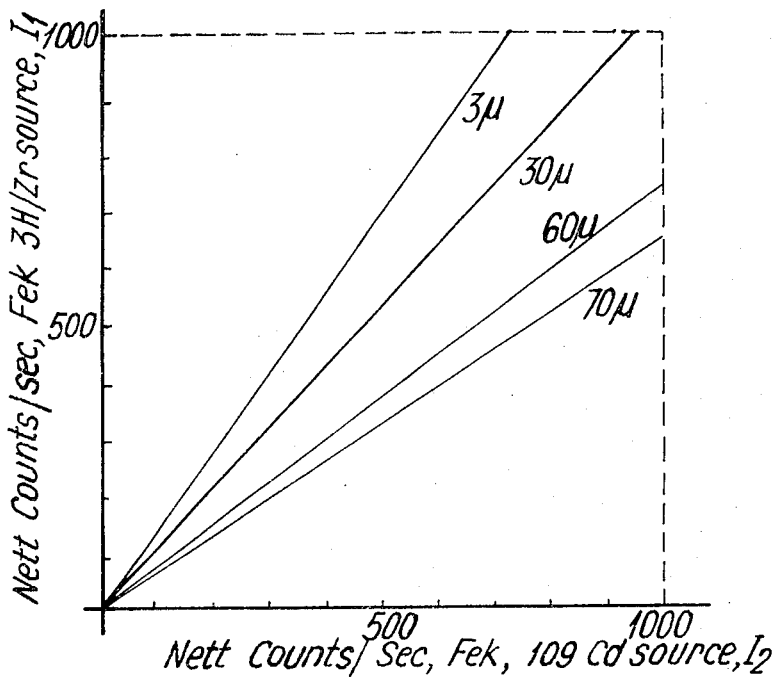

United States Patent

Carr-Brion et al.

[15] 3,666,943
[45] *May 30, 1972

[54] METHOD OF AND APPARATUS FOR DETERMINING THE MEAN SIZE OF GIVEN PARTICLES IN A FLUID

[72] Inventors: Kenneth Garfield Carr-Brion; Doris Audrey Jenkinson, both of Stevenage, Hertfordshire, England

[73] Assignee: National Research Development Corporation, London, England

[*] Notice: The portion of the term of this patent subsequent to Sept. 15, 1987, has been disclaimed.

[22] Filed: Sept. 3, 1968

[21] Appl. No.: 756,767

[30] Foreign Application Priority Data

Sept. 20, 1967 Great Britain ..................... 42,875/67

[52] U.S. Cl. .................... 250/51.5, 250/43.5 D, 250/43.5 R, 250/83.3 D
[51] Int. Cl. ................................................. G01n 23/22
[58] Field of Search ............ 250/51.5, 83.3 D, 43.5 D, 43.5 R

[56] References Cited

UNITED STATES PATENTS

| 2,920,206 | 1/1960 | Heller | 250/83.3 D |
| 3,150,261 | 9/1964 | Furbee et al. | 250/51.5 |
| 3,529,151 | 9/1970 | Carr-Brion | 250/43.5 |

OTHER PUBLICATIONS

Claisse et al., " Heterogeneity Effects in X-Ray Analysist" ; Advances in X-ray Analysis; 1962; Vol. 5, pp. 335– 354.

Primary Examiner—James W. Lawrence
Assistant Examiner—Morton J. Frome
Attorney—Cushman, Darby & Cushman

[57] ABSTRACT

A method of determining the mean size of given solid particles in a fluid comprises passing two x-ray beams of different energies into the fluid. The energies of the two X-ray beams being such that the resulting intensity of fluorescent radiations emitted from the particles due to one beam is substantially independent of the mean size of the particles while the intensity of fluorescent radiations emitted from the particles due to the other beam is substantially dependent upon the mean size of the particles. A comparison of the intensities of these two types of emitted fluorescent radiations gives an indication of the mean particle size.

7 Claims, 2 Drawing Figures

METHOD OF AND APPARATUS FOR DETERMINING THE MEAN SIZE OF GIVEN PARTICLES IN A FLUID

This invention, relates to a method of and apparatus for determining the mean size of given solid particles in a fluid.

The invention utilizes the fluorescent intensities emitted from given solid particles in a fluid, when electromagnetic radiation is incident thereon, to determine the mean size of said given solid particles.

By the term "electromagnetic radiation," as used herein, it is intended to include both x-radiation and gamma-radiation.

The degree of dependence of the said fluorescent intensities on particle size is a function of the difference between the mass absorption coefficients of the particles containing the element being analyzed and the sample as a whole.

When electromagnetic radiation such as x-radiation is incident upon heterogeneous material, such as fluid containing solid particles in suspension, the intensity of the fluorescent radiation emitted by the particles is also a function of the size of each particle, assuming that the particles either consist of or contain a given solid component which fluoresces in response to the incident radiation. In this case, the fluorescent intensity will be a function of the mean particle size. Such dependence on the mean particle size is observable only for a certain range of particle sizes, and is dependent on the mean energy of the incident electromagnetic radiation and the composition of the particles in respect of the given fluorescent component of the particles.

In order to provide an indication of the mean size of given solid particles which form a fluorescent component of the particles in a fluid, it is necessary to distinguish the fluorescent effect due to all the particles and the effect due to the concentration of the fluorescent component of the particles in the fluid, both these effects being, of course, present together. In the case of the present invention, this is achieved by measuring the fluorescent intensity of two separate beams of radiation having different mean energies, so chosen that one beam shows a marked "particle size effect," that is, suffers excitation in dependence on the mean particle size, and thus emits fluorescent radiation and the other of which shows a negligible such effect.

According, therefore, to the present invention in one aspect thereof, there is provided a method of determining the mean size of given solid particles in a fluid comprising passing into the fluid two respective electromagnetic radiations having two different respective mean energies, the mean energies of the said electromagnetic radiations being such that the resulting intensity of fluorescent radiations emitted from the particles due to one of said radiations is substantially independent of the mean size of the particles while the intensity of fluorescent radiations emitted from the particles due to the other of said radiations is substantially dependent upon the mean size of the particles in the fluid, and comparing said resulting intensities to provide an indication of said mean particle size.

According to one preferred method of carrying out the invention, the fluid is passed through two chambers in succession and the two respective electromagnetic radiations are emitted by two respective sources and pass into different said chambers before the said fluorescent radiations are measured by two respective detectors.

The respective sources may be respective radioisotope sources, or x-ray tubes with different emitted energies.

The respective electromagnetic radiations may comprise radiations emitted by respective targets on irradiation from at least one x-ray tube or radioisotope source.

Preferably the fluorescent radiation emitted by the particles is passed through a filter before being incident upon a detector to prevent electromagnetic radiations backscattered from the fluid and particles from being detected.

Calibration graphs can be prepared showing the relation between the respective said intensities of fluorescent radiations for different mean sizes of the given particles in the fluid.

The invention also includes apparatus for determining the mean size of given solid particles in a fluid comprising means for producing and passing into a fluid two respective electromagnetic radiations having two different respective mean energies such that the intensity of fluorescent radiations emitted from the particles due to one of said radiations is substantially independent of the mean size of particles in the fluid while the intensity of fluorescent radiations emitted from the particles due to the other of said radiations is substantially dependent upon the mean size of particles in the fluid, and means for comparing these two intensities respectively resulting from said two respective electromagnetic radiations to provide an indication of said mean particle size.

Figure 2:
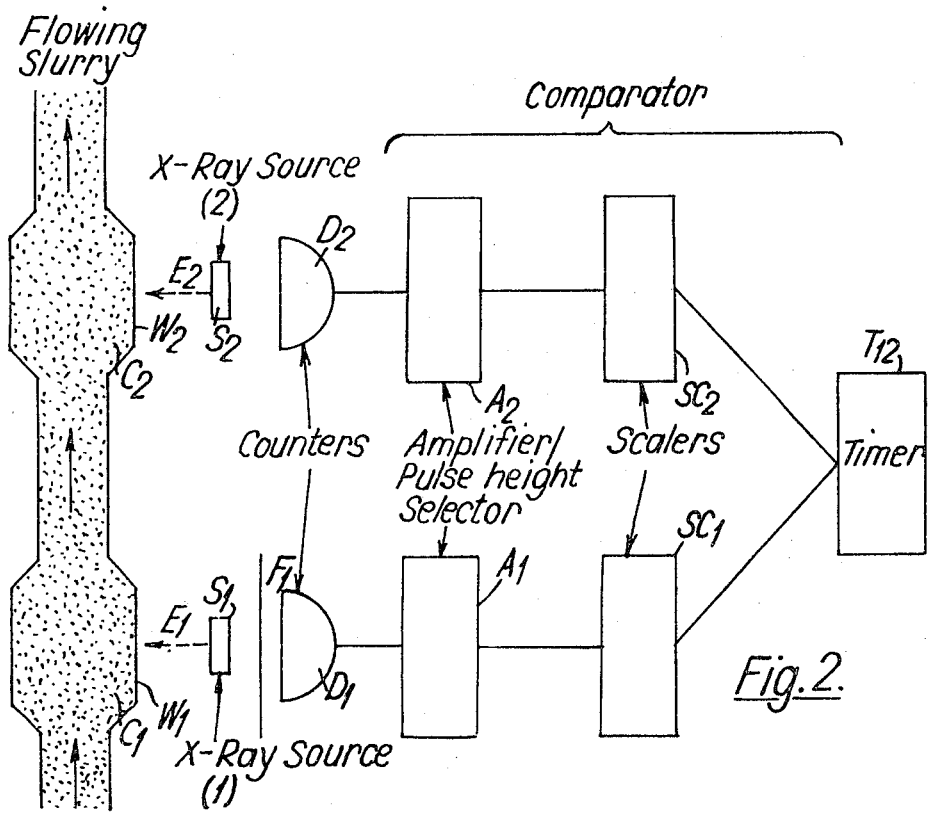

The invention will be described, merely by way of example, with reference to the accompanying drawings, in which:

FIG. 1 illustrates calibration graphs obtained by the method of the present invention, and FIG. 2 illustrates diagrammatically an apparatus for carrying out the invention.

Referring first to FIG. 2, there is shown, purely diagrammatically, a form of apparatus according to the invention employing two separate x-ray beams of different respective mean energies $E_1$, $E_2$. The respective beams are emitted by respective sources $S_1$, $S_2$ which comprise respective x-ray tubes or radio-isotope sources. Alternatively, the sources $S_1$, $S_2$ may be secondary sources, that is, they may comprise respective targets irradiated by x- or gamma-radiation from respective "primary" sources, or from a common primary source. In this case, the or each primary source may comprise an x-ray tube or a radio-isotope. The respective energies $E_1$, $E_2$, of the secondary x-rays emitted by the respective sources $S_1$, $S_2$ are in this case determined by selection of the respective elements comprising the respective targets.

It is desired to find the mean size of particles which form a given fluorescent component of the particles in a fluid under test, for example, a liquid slurry. The slurry is passed through two chambers $C_1$, $C_2$ in succession in the direction indicated by the arrows. Each chamber $C_1$, $C_2$ is provided with an x-ray window $W_1$, $W_2$ respectively, which are disposed perpendicularly to the direction of the respective x-ray beams from the sources $S_1$, $S_2$. The windows $W_1$, $W_2$ may be made of any convenient known material transparent to the x-rays being used, a suitable material being that sold under the Trade Mark "MELINEX." "MELINEX" refers to a terylene film produced by Imperial Chemical Industries Limited of England comprising a polycondensation of terephthalic acid with ethelene glycol.

The sources $S_1$, $S_2$ are disposed between the respective chambers $C_1$, $C_2$ and respective x-ray detectors $D_1$, $D_2$. The detectors $D_1$, $D_2$ may be of any convenient type and may, for example, be xenon proportional counters with pre-amplifiers.

At any given instant, the fluorescence emitted by the slurry in response to the respective x-rays from the sources $S_1$, $S_2$ incident upon the respective chambers $C_1$, $C_2$ is measured by the respective detectors $D_1$, $D_2$.

The respective energies $E_1$, $E_2$ of the x-rays from the respective sources $S_1$, $S_2$ are so chosen that the x-rays of energy $E_1$ show marked "particle size effect," as described above, in respect of the given fluorescent component of the particles in the fluid, while the x-rays of energy $E_2$ show a negligible "particle size effect" in respect of this fluorescent component of the particles. A comparison of the two intensities $I_1$, $I_2$ detected by the respective detectors $D_1$, $D_2$ is then made in a comparator comprising amplifiers and pulse height selectors $A_1$, $A_2$, scalers $SC_1$, $SC_2$, and a timer $T_{12}$.

A filter $F_1$ is disposed between the source $S_1$ and the detector $D_1$ to prevent electromagnetic radiations backscattered from the slurry from being incident on the detector $D_1$. The filter $F_1$ may be made of thin metal foil made from a type and thickness of metals as will be appreciated by those skilled in the art. A filter may not be provided with the detector $D_2$ since, with that detector, the back scattered radiation is necessarily of a much higher energy than the fluorescent radiation and can be separated from the latter by the pulse height selector $A_2$.

One method of calibrating the apparatus is illustrated in FIG. 1. The respective intensities $I_1$, $I_2$ detected by the respective detectors $D_1$, $D_2$ (measured in counts/second) are plotted on respective coordinate axes for different particle densities in the slurry, different graphs being plotted for different mean sizes of the given particle component of the slurry. FIG. 1 illustrates the calibration of apparatus such as that shown in FIG. 2 for determining the mean size of haematite particles contained as a slurry in water. The respective radiations employed were respectively from a 3H/Zr source and 109 Cd source, these radiations having respective energies $E_1$, $E_2$ such that they display a substantial "particle size effect" and negligible "particle size effect" respectively in respect of the haematite particles.

The 3H/Zr source emits bremsstrahlung radiation which contains energies which efficiently excite the iron K x-rays. The 109 Cd source emits 22 Kev x-rays which excite the iron K x-rays with low efficiency.

Four calibration curves are illustrated, each showing the effect of variations in the concentration of the fluorescent component (haematite) for haematite particles of four different particle sizes (measured in microns).

If a series of curves such as those of FIG. 1 were plotted for samples of various known mean particle sizes of the fluorescent component of the particles, the mean particle size corresponding to a curve obtained with a slurry containing particles of unknown size could be deduced by interpolation.

The apparatus according to the invention can only be used where the composition of solid particles can be controlled within limits which do not cause the fluorescent intensity of the x-rays to vary significantly. In certain cases the x-ray energies $E_1$, $E_2$ can also be selected to reduce their dependence on variations in the composition of the fluorescent phase.

The measured intensity $I_1$ may be maximized by selecting the mean energy of the x-rays from source $S_1$ so that they just cause the element present in major amounts in the particle component to fluoresce, i.e., so that the energy $E_1$ is just within the absorption edge of the element.

We claim:

1. A method of determining the mean particle size of given solid particles in a fluid, said method comprising:

passing into the fluid, from the same side, two respective electromagnetic radiations having two different respective mean energies, the mean energies of the said electromagnetic radiations being such that the resulting intensity of fluorescent radiations emitted from the particles due to one of said radiations is substantially independent of the mean particle size of said particles and the intensity of fluorescent radiations emitted from the particles due to the other of said radiations is substantially dependent on the mean particle size of particles in the fluid;

filtering the fluorescent radiations emitted from the particles due to the other of said radiations to prevent electromagnetic radiations back-scattered from the fluid and particles from being detected;

detecting, on said same side of the fluid, the resulting intensity of fluorescent radiations emitted from the particles; and comparing said resulting intensities to provide an indication of said mean particle size.

2. A method as in claim 1 wherein the fluid is passed through two chambers in succession and the two respective electromagnetic radiations are emitted by two respective sources and pass into different said chambers before the said fluorescent radiations are measured by two respective detectors.

3. A method as in claim 2 wherein said respective sources comprise respective radio-isotope sources.

4. A method as in claim 1 wherein the respective electromagnetic radiations comprise radiations emitted by respective targets on irradiation from at least one x-ray tube.

5. A method as in claim 1 wherein calibration graphs are prepared showing the relation between the respective said intensities of fluorescent radiations for different mean sizes of the given particles in the fluid.

6. A method as in claim 1 wherein the respective electromagnetic radiations comprise radiations emitted by respective targets or irradiation from at least one radioisotope source.

7. Apparatus for determining the mean size of given solid particles in a fluid, said apparatus comprising:

means for producing and passing into a fluid two respective electromagnetic radiations having two different respective mean energies, the mean energies of the said electromagnetic radiations being such that the resulting intensity of fluorescent radiations emitted from the particles due to one of said radiations is substantially independent of the mean size of said particles and the intensity of fluorescent radiations emitted from the particles due to the other of said radiations is substantially dependent on the mean size of the particles in the fluid;

a filter for filtering the fluorescent radiations emitted from the particles due to the other of said radiations to prevent electromagnetic radiations back-scattered from the fluid and particles from being detected;

detector means for detecting the resulting intensity of fluorescent radiations emitted from the particles, said detector and said means for producing being disposed on the same side of the fluid; and means for comparing said resulting intensities to provide an indication of said mean particle size.

* * * * *